US006998183B1

(12) United States Patent
Pirzada et al.

(10) Patent No.: US 6,998,183 B1
(45) Date of Patent: Feb. 14, 2006

(54) MAGNETIC RECORDING MEDIUM WITH MULTILAYER CARBON OVERCOAT

(75) Inventors: Shahid A. Pirzada, Fremont, CA (US); Ian L. Sanders, Morgan Hill, CA (US); Jia-Jay Liu, Pleasanton, CA (US); Kenneth E. Johnson, Morgan Hill, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/032,382

(22) Filed: Jan. 10, 2005

Related U.S. Application Data

(63) Continuation of application No. 10/269,292, filed on Oct. 11, 2002, now Pat. No. 6,875,492.

(60) Provisional application No. 60/335,923, filed on Nov. 15, 2001.

(51) Int. Cl.
*G11B 5/72* (2006.01)

(52) U.S. Cl. .................................. 428/833.3
(58) Field of Classification Search ............. 428/833.3
See application file for complete search history.

(56) References Cited

U.S. PATENT DOCUMENTS

| 5,607,783 | A | 3/1997 | Onodera ...................... 428/694 |
| 5,785,825 | A | 7/1998 | Hwang et al. ......... 204/192.16 |
| 5,855,746 | A | 1/1999 | Prabhakara et al. ... 204/192.16 |
| 5,858,182 | A | 1/1999 | Horng et al. .......... 204/192.16 |
| 5,945,219 | A | 8/1999 | Yamada et al. ............. 428/408 |
| 6,086,730 | A | 7/2000 | Liu et al. ............... 204/192.16 |
| 6,238,780 | B1 | 5/2001 | Wu et al. .................... 428/213 |
| 6,312,798 | B1 | 11/2001 | Ma et al. .................... 428/336 |
| 6,329,037 | B1 | 12/2001 | Kokaku et al. ............. 428/65.3 |
| 6,358,636 | B1 | 3/2002 | Yang et al. .................. 428/694 |
| 6,682,807 | B1 | 1/2004 | Lairson et al. .............. 428/212 |
| 6,706,363 | B1 | 3/2004 | Honda et al. ................ 428/141 |

Primary Examiner—Stevan A. Resan
(74) Attorney, Agent, or Firm—David M. Sigmond

(57) ABSTRACT

Magnetic recording media having a protective carbon overcoat adapted to protect the magnetic recording layer from surface contact events and corrosion. The carbon overcoat includes at least two layers. A first layer is adapted to protect the magnetic recording layer from surface contact events and corrosion. The second layer is disposed on the first layer and is adapted to enhance the bonding of a lubricant to the carbon overcoat and to minimize head degradation. The magnetic recording media of the present invention advantageously enables the use of thin carbon overcoats, enhancing areal density, while maintaining good tribological properties.

48 Claims, 1 Drawing Sheet

MAGNETIC RECORDING MEDIUM WITH MULTILAYER CARBON OVERCOAT

This application is a continuation of U.S. application Ser. No. 10/269,292 filed on Oct. 11, 2002.

U.S. application Ser. No. 10/269,292 filed on Oct. 11, 2002, now U.S. Pat. No. 6,875,492 claims priority from U.S. Provisional Application Ser. No. 60/335,923 filed on Nov. 15, 2001, the entire disclosure of which is incorporated herein by reference in its entirety.

BACKGROUND OF THE INVENTION

1. Field of the Invention

The present invention relates generally to magnetic data storage media having a protective carbon overcoat. In particular, the present invention relates to an improved thin carbon overcoat for magnetic data storage disks and a method for the fabrication of an improved carbon overcoat.

2. Description of Related Art

Thin film magnetic recording media, such as hard disks, are utilized to store large amounts of data and are typically composed of multiple layers, including a rigid substrate, an underlayer and one or more magnetic layers. The magnetic recording layer includes a polycrystalline magnetizable material that is locally magnetized by a read/write head that traverses the surface of the recording medium during operation of the disk drive.

When a disk drive is in operation, the disk rotates at a high rate of speed and the read/write head flies over the surface of the hard disk as it rotates. The read/write head rests against the surface of the hard disk when the disk is not rotating. When the disk is activated and begins to rotate, the read/write head rises above the disk surface on a bearing of air and can be moved in a controlled fashion to read and write data on the disk. When the disk drive is turned off and the disk stops rotating, the head again comes into sliding contact with the disk surface. These surface contact events can damage the surface of the hard disk, including the magnetic recording layer. Accordingly, a carbon overcoat is typically deposited over the magnetic recording layer to protect the recording layer during start and stop operations. The carbon overcoat also protects the magnetic recording layer from corrosion. A thin layer of lubricant is applied over the protective carbon overcoat to improve the interaction between the read/write head and the disk surface and to improve the tribological performance of the hard disk drive. The liquid lubricant must adhere to the carbon overcoat such that the rotational velocity of the disk does not cause a significant amount of the lubricant to be lost from the disk surface.

The carbon overcoat layers are typically formed by sputtering. For example, U.S. Pat. No. 5,607,783 by Onodera discloses a magnetic data storage hard disk including a carbon protective film over the magnetic layers. The hydrogen content of the carbon film near the magnetic layer is lower than the hydrogen content near the lubrication layer. It is disclosed that the portion of the carbon layer with a low hydrogen content shows high hardness and that the upper carbon layer with a high hydrogen content shows more flexibility. The carbon layer has a thickness of about 180 angstroms and is formed by sputtering in an atmosphere containing methane gas ($CH_4$).

U.S. Pat. No. 5,785,825 by Hwang et al. also discloses a magnetic hard disk including a carbon overcoat layer. The carbon overcoat is a dual phase carbon overcoat including an amorphous carbon film sputtered on a magnetic layer and a doped amorphous carbon film sputtered on the amorphous carbon film. The doped amorphous carbon film can include hydrogen or nitrogen. The total thickness of the dual phase carbon overcoat is about 200 angstroms.

U.S. Pat. No. 5,855,746 by Prabhakara et al. also discloses a magnetic hard disk including a carbon overcoat layer. The carbon overcoat includes a first buffer layer adjacent to the magnetic layer that does not include nitrogen and a nitrogenated carbon layer over the buffer layer. The buffer layer is adapted to protect the magnetic layer from damage due to the nitrogen. The carbon overcoat has a total thickness of about 110 angstroms and the individual layers of the carbon overcoat are each formed by sputtering.

U.S. Pat. No. 5,858,182 by Horng et al. discloses a magnetic hard disk including a wear resistant carbon overcoat layer and a lubricating carbon layer. The wear resistant carbon layer has a thickness of from 40 to 200 angstroms and is formed from nitrogenated wear resistant carbon materials and hydrogenated wear resistant carbon materials. A lubricating carbon layer is disposed over the wear resistant layer and has a thickness of 20 to 50 angstroms and contains 30 to 40 atomic percent hydrogen.

U.S. Pat. No. 5,945,219 by Yamada et al. discloses a magnetic recording medium of the metal film type including a carbon overcoat that has rust proofing and lubricating properties. The overcoat is formed by chemical vapor deposition (CVD) wherein a lubricant and a rust proofing agent are introduced during the CVD process. The overcoat has a total thickness of about 100 angstroms.

U.S. Pat. No. 6,086,730 by Liu et al. discloses a magnetic hard disk including a carbon overcoat. The carbon overcoat is formed by pulse sputtering and includes an amorphous hydrogenated carbon thin film with a high $sp^3$ bond content, which is indicative of diamond bonding and high hardness.

U.S. Pat. No. 6,312,798 by Ma et al. discloses a magnetic hard disk including a carbon overcoat layer. The carbon overcoat layer includes a nitrogen doped carbon hydrogen film that is formed by ion beam deposition. It is disclosed that the nitrogen lowers the resistivity of the film, thereby eliminating charge buildup and reducing glide noise. The film has a total thickness of from about 20 to 80 angstroms.

U.S. Pat. No. 6,358,636 by Yang et al. discloses a magnetic hard disk that includes protective overlayers. The overlayers include a transition metal-silicon or transition metal-germanium interlayer and a carbon overcoat. It is disclosed that the carbon overcoat has a thickness of at least about 30 angstroms can be formed by sputter deposition, as well as ion beam deposition or CVD.

There is a continuing demand to increase the recording density (i.e., areal density) of magnetic hard disks to enhance data storage capacity. One technique to increase the areal density includes decreasing the spacing between the read/write head and the magnetic layer. This spacing can be reduced by reducing the thickness of the carbon overcoat. However, the carbon overcoat must remain sufficiently robust to provide effective protection against wear due to head-disk surface contact events and effective protection against corrosion.

The carbon overcoat includes an interface between the magnetic layer and the carbon overcoat, as well as an interface between the carbon overcoat and the lubricant. The mechanical and chemical properties of the carbon overcoat and the surface reactivity of the carbon overcoat affect the nature of the carbon-lubricant bonding, which subsequently affects the interaction between the lubricant and the read/write head.

Technologies such as ion beam deposition, cathodic arc deposition, and plasma-enhanced chemical vapor deposition (PECVD) are capable of producing hard carbon overcoats with a high fraction of $sp^3$ bond content. For example, ion beam carbon (IBC) deposition technology can be used to produce protective carbon overcoats having improved properties as compared to sputtered carbon. Ion beam carbon formed using a high impact energy ion beam provides a higher fraction of $sp^3$ content in the carbon overcoat that leads to high hardness, high density, high elastic modulus, low friction and improved chemical inertness. Ion beam carbon also has a higher resistance to tribochemical wear than sputtered carbon.

However, hard carbon overcoats lead to severe glide head-disk interactions (i.e., glide noise) and head degradation. Further, ion beam carbon often has a high hydrogen content. A high hydrogen content increases the electrical resistivity of the overcoat which can lead to charge buildup on the surface, also resulting in head damage. High hydrogen content in the overcoat can also decrease the dangling bond density in the carbon layer, resulting in lower carbon lubricant bonding and pick-up of lubricant by the read/write head. The physical and chemical properties of both the carbon overcoat and the lubricant affect the glide noise and head degradation. The mechanical/chemical nature of the carbon overcoat also affects the degradation of the lubrication layer, which is important for improving wear durability at the head-disk interface.

SUMMARY OF THE INVENTION

It is an object of the present invention to provide a magnetic recording medium having a thin carbon overcoat and having good tribological properties and reduced glide noise and head degradation.

In one aspect of the present invention, a magnetic recording medium is provided that includes a non-magnetic substrate, a magnetic recording layer disposed over the substrate, a carbon overcoat disposed over the magnetic recording layer and a lubricant disposed over the carbon overcoat. The carbon overcoat includes at least a first carbon layer and a second carbon layer disposed over the first carbon layer having an average thickness of from about 1 angstrom to about 20 angstroms.

The carbon overcoat in accordance with this embodiment of the present invention advantageously has a reduced thickness thereby enabling an increase in the areal density of the magnetic recording layer. The first carbon layer is adapted to protect the magnetic recording layer from damage due to start/stop operations and corrosion. The second carbon layer is adapted to increase the carbon-lubricant interaction resulting in increased bonding of the lubricant to the carbon overcoat and to minimize head degradation.

According to another aspect of the present invention, a magnetic recording medium is provided. The magnetic recording medium includes a non-magnetic substrate, a magnetic recording layer, a carbon overcoat disposed over the magnetic recording layer and a lubricant disposed over the carbon overcoat. The carbon overcoat includes a first carbon layer having a first hydrogen content and a second carbon layer disposed on the first carbon layer having a second hydrogen content that is lower than the hydrogen content of the first layer. The first carbon layer having a higher hydrogen content is harder and denser than the second carbon layer to provide wear resistance, whereas the second carbon layer provides enhanced lubricant bonding and less head degradation.

According to another aspect of the present invention, a magnetic hard disk for magnetically recording data is provided that includes a non-magnetic substrate, a magnetic recording layer, a carbon overcoat disposed over the magnetic recording layer and a lubricant disposed over the carbon overcoat. The first carbon layer has a hydrogen content of from about 20 to about 35 atomic percent and has average thickness of not greater than about 40 angstroms. A second carbon layer is disposed over the first carbon layer and has a hydrogen content that is lower than the hydrogen content of the first carbon layer and has an average thickness that is not greater than about 20 angstroms.

According to another aspect of the present invention, a method for the fabrication of a magnetic recording medium is provided. The method includes the steps of providing a substrate, depositing a magnetic recording layer over the substrate, depositing a carbon overcoat over the magnetic layer and applying a liquid lubricant over the carbon overcoat. The carbon overcoat is formed by depositing a first carbon layer by a method selected from ion beam deposition, cathodic arc deposition and plasma enhanced chemical vapor deposition. The second carbon layer is deposited by physical vapor deposition, e.g., sputtering. Preferably, the second carbon layer is deposited by sputtering carbon for not greater than about 2 seconds to form a thin layer having a thickness of not greater than about 20 angstroms.

Additional aspects and advantages of the present invention will be become apparent to those skilled in the art upon consideration of the further description provided herein below

DESCRIPTION OF THE INVENTION

Figure 1:
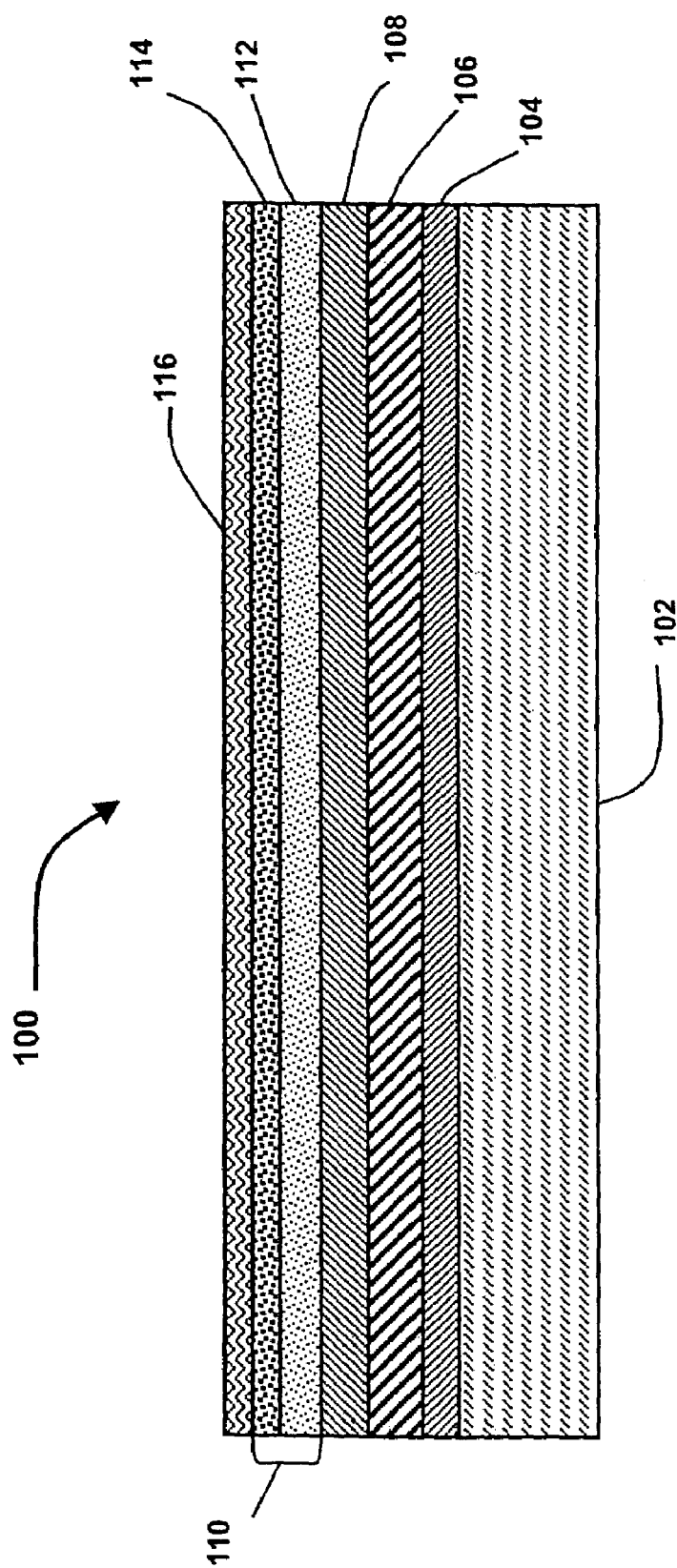
FIG. 1 illustrates a schematic cross-section of a magnetic recording medium including a functionalized carbon overcoat according to the present invention.

The present invention relates to a protective carbon overcoat on a magnetic recording medium such as a hard disk and methods for fabricating the carbon overcoat. The carbon overcoat according to the present invention is functionalized to provide protection for the magnetic recording layer while maintaining good lubricant bonding and reduced loss of lubricant from the surface of the disk.

FIG. 1 illustrates a schematic cross-section of a magnetic recording medium according to an embodiment of the present invention. The magnetic recording medium 100 includes multiple material layers that are deposited upon a substrate 102, including one or more magnetic recording layers 108. Disposed between the substrate 102 and the magnetic recording layer 108 is one or more (optional) material layers 104 and 106 that are adapted to control the crystallographic properties of the magnetic recording layer 108. A carbon overcoat 110 is disposed over the magnetic recording layer 108 to protect the recording layer from damage due to surface contact events and to protect the magnetic recording layer 108 from corrosion.

The substrate 102 can be fabricated from a number of materials. When the magnetic recording medium is a hard disk, a particularly preferred material for the rigid substrate 102 according to the present invention is aluminum (Al) or an aluminum alloy coated with a layer of nickel phosphorous (NiP). However, it will be appreciated that the rigid substrate 102 can also be fabricated from other materials, such as glass or a glass-containing material, including glassceramics. The rigid substrate 102 typically has an average thickness in the range of from about 30 mil to about 70 mil (about 0.76 mm to about 1.78 mm) and has a smooth surface upon which the remaining layers can be deposited.

A magnetic recording layer 108 is disposed over the substrate 102. The magnetic recording layer 108 can be fabricated from any of a number of magnetic recording materials. Typically, the magnetic recording layer 108 will include a polycrystalline metallic material, such as a cobalt-based alloy. The magnetic recording layer 108 typically has an average thickness of at least about 30 angstroms, such as from about 60 angstroms to about 100 angstroms. It will appreciated that the magnetic recording media 100 can include other magnetic layers in addition to layer 108.

Additional material layers can be disposed between the substrate 102 and the magnetic recording layer 108, such as underlayer 104 and interlayer 106. The underlayer 104 is in direct contact with the interlayer 106 and is adapted to control the grain structure and orientation of the interlayer 106. The interlayer 106, in turn, is in direct contact with the magnetic recording layer 108 and is adapted to control the grain structure and grain orientation of the polycrystalline magnetic recording layer 108. For example, the interlayer 106 can be a chromium-containing tertiary alloy layer and the underlayer 104 can be a chromium/molybdenum alloy layer.

Disposed over the magnetic recording layer 108 is a carbon overcoat 110 that is adapted to protect the magnetic recording layer 108 from interactions with the read/write head of the disk drive. According to the present invention, the carbon overcoat 110 includes at least a first carbon layer 112 and a second carbon layer 114 disposed over the first carbon layer 112.

According to the present invention, the first carbon layer 112 is adapted to protect the magnetic recording layer 108 from surface contact events and from corrosion. However, the first carbon layer 112 is also relatively thin, which enables the read/write head to come within close proximity to the magnetic recording layer 108, thereby enhancing the areal density that is achievable in the magnetic recording layer 108. In this regard, the first carbon layer 112 is relatively thin and preferably has an average thickness of not greater than about 40 angstroms, more preferably not greater than about 30 angstroms and even more preferably not greater than about 20 angstroms. To maintain sufficient protection for the underlying magnetic layer, however, the first carbon layer preferably has an average thickness of at least about 10 angstroms.

The first carbon layer 112 is harder and denser than the second carbon layer 114, discussed below, and preferably has a higher $sp^3$ bond content than the second carbon layer, which is indicative of diamond-type bonding. According to the present invention, the hydrogen content of the first carbon layer 112 is preferably higher than the hydrogen content of the second carbon layer 114. For example, the first carbon layer can have a hydrogen content of at least about 20 atomic percent, such as from about 25 to about 35 atomic percent. The first carbon layer preferably has a nitrogen content that is low, and preferably is not greater than about 10 atomic percent.

The second carbon layer 114 is disposed over the first carbon layer 112 and is adapted to enhance the interaction between the carbon overcoat 110 and the lubricant. Specifically, the second carbon layer 114 is adapted to improve carbon-lubricant bonding, reduce lubricant pick-up by the read-write head and reduce glide noise, i.e., reduce glide-head interaction and reduce head degradation.

The second carbon layer 114 is also relatively thin and preferably has an average thickness of at least about 1 angstrom, and more preferably at least about 2 angstroms. Preferably, the average thickness is not greater than about 20 angstroms, more preferably not greater than about 15 angstroms and even more preferably not greater than about 10 angstroms. The second carbon layer 114 preferably has hydrogen content that is lower than the hydrogen content in the first carbon layer 112.

A low hydrogen content in the second carbon layer 114 advantageously reduces charge buildup on the disk surface. Preferably, the second carbon layer has a hydrogen content of not greater than about 1.0 atomic percent, more preferably not greater than about 5 atomic percent and even more preferably not greater than about 1 atomic percent hydrogen. Further, the second carbon layer 114 preferably has a nitrogen content that is higher than the nitrogen content in the first carbon layer to enhance lubricant bonding. In one embodiment, the second carbon layer has a nitrogen content of from about 1 to about 30 atomic percent.

In accordance with the foregoing, the carbon overcoat 110 is relatively thin, enabling the areal density of the magnetic recording layer to be increased. Preferably, the average thickness of the carbon overcoat 110 is at least about 15 angstroms and is not greater than about 40 angstroms, even more preferably not greater than about 30 angstroms. The first carbon layer 112 is hard and dense to protect the magnetic recording layer 108, while the second carbon layer 114 provides enhanced bonding of the lubricant 116, resulting in reduced losses of lubricant from the disk surface.

The carbon overcoat 110 can be deposited over the entire surface of the magnetic recording medium 100. Optionally, the carbon overcoat 110 can be selectively deposited over the landing zones on the magnetic recording medium 100, i.e., the areas of the disk surface where the read/write head comes into contact with magnetic recording medium during start/stop operations.

A lubricant 116 is also disposed on the carbon overcoat 110. The lubricant is typically a fluorinated liquid compound adapted to improve the interaction between the read/write head and the disk surface. For example, the lubricant can be selected from perfluoropolyethers (PFPE's) such as FOMBLIN AM, FOMBLIN ZDOL, and FOMBLIN Z-TETRAOL (all available from Ausimont S.p.A., Milano, Italy).

The magnetic layer 108 as well as any intervening layers (e.g., layers 104 and 106) can be formed by conventional methods known to those skilled in the art. For example, these layers can be formed by physical vapor deposition (e.g., sputtering) of the desired material.

According to the present invention, the first carbon layer is preferably formed by a method selected from ion beam deposition, cathodic arc deposition or plasma enhanced chemical vapor deposition (PECVD).

The ion beam deposition (IBD) process according to the present invention utilizes a hydrocarbon precursor to form the first carbon layer. Preferably, the hydrocarbon precursor is selected from ethylene ($C_2H_4$), acetylene ($C_2H_2$), ethane ($C_2H_6$) or mixtures thereof. The selection of the hydrocarbon will directly influence the hydrogen content of the deposited carbon layer. For example, a carbon layer deposited from ethane will have a higher hydrogen content than a carbon layer deposited from acetylene due to the higher hydrogen content of the hydrocarbon source. Mixtures of different hydrocarbon gases can be used to control the hydrogen content of the first carbon layer.

An ion beam deposition process is described, for example, in U.S. Pat. No. 6,312,798 by Ma et al., the disclosure of which is incorporated herein by reference in its entirety. The ion beam deposition process involves the implantation of ions, such as from ionized hydrocarbons, into the substrate. The ions are propelled to the substrate by the potential difference in the deposition chamber.

The plasma environment and the potential difference in the ion beam deposition process provide ions with moderate energy, such as in the range of from 60 eV to 300 eV, preferably from 60 eV to 250 eV, that advantageously provide carbon layers with a high $sp^3$ content and, as a result, good durability and wear resistance.

PECVD is similar to ion beam deposition. However, the potential difference in the chamber is slightly lower. Cathodic arc deposition utilizes a target containing the material to be deposited, such as carbon. A current is passed through the target and the target emits clusters of atoms that are propelled toward the substrate under a potential difference. The resulting coating can have a high density and a high $sp^3$ content.

The second carbon layer 114 can be deposited by flash depositing a very thin (e.g., 1 to 20 angstroms) carbon layer with a different surface chemistry, hardness, surface reactivity and density than the first carbon layer 112. Flash depositing entails sputtering for a very short time period, such as not greater than about 2 seconds and preferably from about 0.3 to 1 seconds. Longer sputtering times will lead to thicker coatings.

The second carbon layer 114 can be deposited by sputtering carbon, including sputtering carbon in the presence of nitrogen gas to form a nitrogenated (nitrogen doped) carbon layer. The second carbon layer 114 can also be deposited by sputtering carbon in the presence of hydrogen gas to form a hydrogenated (hydrogen doped) carbon layer, if it is desired to have some hydrogen in the second carbon layer. The second carbon layer 114 can also be deposited using a glow discharge plasma, including a nitrogenated glow discharge plasma to form a nitrogen doped carbon layer.

The carbon overcoat in accordance with the present invention results in high lubricant bonding, a substantial reduction in glide noise and a reduction in head degradation. Advantageously, only the top layer of the carbon overcoat is functionalized to enhance lubricant interaction. The carbon overcoat of the present invention enhances the carbon/lubricant interaction, yet keeps the body of the hard overcoat intact, thus providing excellent tribological and corrosion properties along with significantly reduced glide noise and head degradation.

EXAMPLE

A comparison was made of a single IBC carbon overcoat layer and a dual FIB (Functionalized Ion Beam) carbon overcoat layer according to the present invention. A summary of the 30 Å single layer IBC and FIB dual layer overcoat is presented in Table 1. A thin layer of FOMBLIN Z-TETRAOL (a fluorinated liquid lubricant available from Ausimont S.p.A., Milano, Italy) was applied over each of the carbon layers. The initial thickness of the lubricant layer was measured using FTIR (Fourier Transform Infrared Spectroscopy). Thereafter, a gaseous degreaser was used to remove the portion of the lubricant that was not directly bonded to the carbon surface and the thickness of the lubricant was measured again. The difference in thickness was used to calculate the lubricant bonding ratio illustrated in Table 1.

TABLE 1

SUMMARY OF TRIBOLOGY DATA

| Carbon | Lubricant Thickness Å | Lubricant Bonding Ratio, % | CSS Carbon Wear, % | Lube Spin Loss |
|---|---|---|---|---|
| IBC, 30 Å | 20 | 50 | 0.04 | 18% |
| FIB, 30 Å | 20 | 68 | 0.06 | 13% |

Lube spin loss: 7200 rpm for 10 days at 50° C./80% RH

The FIB carbon layer showed a higher lubricant bonding ratio than the IBC layer. This higher bonding ratio resulted in lower lubricant spin-off, as shown in Table 0.1. Tribology data—carbon wear during contact start stop (CSS) operations—is also shown in Table 1. The data was collected at 50° C. and 80% relative humidity.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A magnetic recording medium, comprising:
   (a) non-magnetic substrate;
   (b) a magnetic recording layer disposed over said non-magnetic substrate;
   (c) a carbon overcoat disposed over and in contact with said magnetic recording layer, said carbon overcoat having an average thickness of not greater than about 40 angstroms, and comprising
      (i) a first carbon layer disposed over and in contact with said magnetic recording layer; and
      (ii) a second carbon layer disposed over and in contact with said first carbon layer and having an average thickness of from about 1 angstrom to about 20 angstroms, wherein said first carbon layer has a hydrogen content that is higher than the hydrogen content in said second carbon layer and the second carbon layer has a hydrogen content that is greater than zero; and
   (d) a lubricant disposed over and in contact with said second carbon layer.

2. A magnetic recording medium as recited in claim 1, wherein said non-magnetic substrate comprises a glass-containing material.

3. A magnetic recording medium as recited in claim 1, wherein said non-magnetic substrate comprises aluminum.

4. A magnetic recording medium as recited in claim 1, wherein said magnetic recording layer comprises a cobalt-based alloy.

5. A magnetic recording medium as recited in claim 1, wherein said first carbon layer has an average thickness of not greater than about 30 angstroms.

6. A magnetic recording medium as recited in claim 1, wherein said first carbon layer has an average thickness of not greater than about 20 angstroms.

7. A magnetic recording medium as recited in claim 1, wherein said carbon overcoat has an average thickness of not greater than about 30 angstroms.

8. A magnetic recording medium as recited in claim 1, wherein said first carbon layer is harder and denser than said second carbon layer.

9. A magnetic recording medium as recited in claim 1, wherein said first carbon layer is thicker than said second carbon layer.

10. A magnetic recording medium as recited in claim 1, wherein said first carbon layer has a hydrogen content of from about 20 to about 35 atomic percent.

11. A magnetic recording medium as recited in claim 1, wherein said first carbon layer has a nitrogen content of not greater than about 10 atomic percent.

12. A magnetic recording medium as recited in claim 1, wherein said second carbon layer has an average thickness of not greater than about 15 angstroms.

13. A magnetic recording medium as recited in claim 1, wherein said second carbon layer has an average thickness of not greater than about 10 angstroms.

14. A magnetic recording medium as recited in claim 1, wherein said second carbon layer has a hydrogen content of not greater than about 10 atomic percent.

15. A magnetic recording medium as recited in claim 1, wherein said second carbon layer has a hydrogen content of not greater than about 5 atomic percent.

16. A magnetic recording medium as recited in claim 1, wherein said lubricant comprises a fluorinated liquid compound.

17. A magnetic recording medium as recited in claim 1, wherein said lubricant comprises a perfluoropolyether compound.

18. A magnetic recording medium as recited in claim 1, wherein said magnetic recording medium is a rigid hard disk.

19. A magnetic recording medium, comprising:
   (a) a non-magnetic substrate;
   (b) a magnetic recording layer disposed over said non-magnetic substrate;
   (c) a carbon overcoat disposed over and in contact with said magnetic recording layer and comprising a first carbon layer disposed over and in contact with said magnetic recording layer and having a first hydrogen content and a second carbon layer disposed over and in contact with said first carbon layer and having a second hydrogen content that is lower than said first hydrogen content, wherein said second carbon layer has an average thickness of not greater than about 15 angstroms; and
   (d) a lubricant disposed over and in contact with said second carbon layer.

20. A magnetic recording medium as recited in claim 19, wherein said non-magnetic substrate comprises a glass-containing material.

21. A magnetic recording medium as recited in claim 19, wherein said non-magnetic substrate comprises aluminum.

22. A magnetic recording medium as recited in claim 19, wherein said magnetic recording layer comprises a cobalt-based alloy.

23. A magnetic recording medium as recited in claim 19, wherein said first hydrogen content is from about 20 to about 35 atomic percent.

24. A magnetic recording medium as recited in claim 19, wherein said second hydrogen content is not greater than about 10 atomic percent.

25. A magnetic recording medium as recited in claim 19, wherein said second hydrogen content is not greater than about 5 atomic percent.

26. A magnetic recording medium as recited in claim 19, wherein said first carbon layer has a nitrogen content of not greater than about 10 atomic percent.

27. A magnetic recording medium as recited in claim 19, wherein said second carbon layer has a nitrogen content of from about 1 to about 30 atomic percent.

28. A magnetic recording medium as recited in claim 19, wherein said first carbon layer has an average thickness of not greater than about 40 angstroms.

29. A magnetic recording medium as recited in claim 19, wherein said first carbon layer has an average thickness of not greater than about 30 angstroms.

30. A magnetic recording medium as recited in claim 19, wherein said first carbon layer is harder and denser than said second carbon layer.

31. A magnetic recording medium as recited in claim 19, wherein said second carbon layer has an average thickness of not greater than about 10 angstroms.

32. A magnetic recording medium as recited in claim 19, wherein said carbon overcoat has an average thickness of not greater than about 40 angstroms.

33. A magnetic recording medium as recited in claim 19, wherein said lubricant comprises a perfluoropolyether compound.

34. A magnetic recording medium as recited in claim 19, wherein said magnetic recording medium is a magnetic hard disk.

35. A magnetic recording medium for magnetically recording data, comprising:
   (a) a non-magnetic substrate;
   (b) a magnetic recording layer disposed over said non-magnetic substrate;
   (c) a carbon overcoat disposed over and in contact with said magnetic recording layer, said carbon overcoat comprising,
      (i) a first carbon layer disposed over and in contact with said magnetic recording layer and having a first hydrogen content of from about 20 to about 35 atomic percent and an average thickness of not greater than about 40 angstroms, and
      (ii) a second carbon layer disposed over and in contact with said first carbon layer and having a second hydrogen content that is lower than the hydrogen content of said first carbon layer and having an average thickness of not greater than about 20 angstroms; and
   (d) a lubricant disposed over and in contact with said second carbon layer.

36. A magnetic recording medium as recited in claim 35, wherein said non-magnetic substrate comprises a glass-containing material.

37. A magnetic recording medium as recited in claim 35, wherein said non-magnetic substrate comprises aluminum.

38. A magnetic recording medium as recited in claim 35, wherein said magnetic recording layer comprises a cobalt-based alloy.

39. A magnetic recording medium as recited in claim 35, wherein said first carbon layer has an average thickness of not greater than about 30 angstroms.

40. A magnetic recording medium as recited in claim 35, wherein said second carbon layer has an average thickness of not greater than about 15 angstroms.

41. A magnetic recording medium as recited in claim 35, wherein said second carbon layer has an average thickness of not greater than about 10 angstroms.

42. A magnetic recording medium as recited in claim 35, wherein said carbon overcoat has an average thickness of not greater than about 40 angstroms.

43. A magnetic recording medium as recited in claim 35, wherein said lubricant comprises a perfluoropolyether compound.

44. A magnetic recording medium as recited in claim 35, wherein said magnetic recording medium is a magnetic hard disk.

45. A magnetic recording medium as recited in claim 35, wherein said first carbon layer has a nitrogen content of not greater than about 10 atomic percent.

46. A magnetic recording medium as recited in claim 35, wherein said second carbon layer has a nitrogen content of from about 1 to about 30 atomic percent.

47. A magnetic recording medium as recited in claim 35, wherein said second carbon layer has a hydrogen content that is greater than zero.

48. A magnetic recording medium as recited in claim 35, wherein said first carbon layer is harder and denser than said second carbon layer.

* * * * *